(12) United States Patent
Masuo et al.

(10) Patent No.: US 11,526,436 B2
(45) Date of Patent: Dec. 13, 2022

(54) MEMORY SYSTEM AND GARBAGE COLLECTION CONTROL METHOD

(71) Applicant: Kioxia Corporation, Minato-ku (JP)

(72) Inventors: Yoko Masuo, Iruma (JP); Yosuke Mitsumasu, Hadano (JP)

(73) Assignee: Kioxia Corporation, Minato-ku (JP)

( * ) Notice: Subject to any disclaimer, the term of this patent is extended or adjusted under 35 U.S.C. 154(b) by 320 days.

(21) Appl. No.: 16/937,661

(22) Filed: Jul. 24, 2020

(65) Prior Publication Data

US 2021/0117317 A1 Apr. 22, 2021

(30) Foreign Application Priority Data

Oct. 17, 2019 (JP) ................................ 2019-190255

(51) Int. Cl.
*G06F 3/06* (2006.01)
*G06F 12/02* (2006.01)
*G06F 17/18* (2006.01)

(52) U.S. Cl.
CPC ........ *G06F 12/0253* (2013.01); *G06F 3/0608* (2013.01); *G06F 3/0658* (2013.01); *G06F 3/0679* (2013.01); *G06F 17/18* (2013.01)

(58) Field of Classification Search
CPC ... G06F 12/0253; G06F 3/0608; G06F 3/0658
See application file for complete search history.

(56) References Cited

U.S. PATENT DOCUMENTS

| | | | |
|---|---|---|---|
| 9,251,055 B2 | 2/2016 | Yonezawa et al. | |
| 10,303,371 B2 | 5/2019 | Hirata | |
| 10,324,833 B2 | 6/2019 | Mitsumasu | |
| 11,112,971 B2* | 9/2021 | Satoyama | G06F 3/0658 |
| 2016/0179430 A1* | 6/2016 | Kong | G06F 3/0679 711/102 |
| 2017/0024137 A1* | 1/2017 | Kanno | G06F 12/0246 |
| 2017/0177546 A1* | 6/2017 | Heinz | G06T 11/206 |
| 2017/0322877 A1* | 11/2017 | Chan | G06F 3/0631 |
| 2018/0260136 A1* | 9/2018 | Huo | G06F 3/0685 |
| 2018/0267715 A1* | 9/2018 | Matsudaira | G06F 3/0611 |
| 2019/0243747 A1* | 8/2019 | Ross | G06F 11/3495 |
| 2020/0042219 A1* | 2/2020 | Wang | G06F 3/0683 |

FOREIGN PATENT DOCUMENTS

| | | |
|---|---|---|
| JP | 2013-200726 A | 10/2013 |
| JP | 5687649 B2 | 3/2015 |

* cited by examiner

*Primary Examiner* — Eliyah S. Harper
(74) *Attorney, Agent, or Firm* — Oblon, McClelland, Maier & Neustadt, L.L.P.

(57) ABSTRACT

According to one embodiment, a memory system includes a controller which controls garbage collection for preparing one or more free blocks by writing valid data read from N blocks to one or more blocks of less than the N. The controller calculates a performance ratio between writing of data in response to a request from a host device and writing of data for the garbage collection in accordance with a data writable capacity remaining in a nonvolatile memory, calculates an average performance ratio from calculated performance ratios of M generations including a calculated latest performance ratio, and adjusts a performance cycle of the garbage collection by applying one of the calculated latest performance ratio and the calculated average performance ratio.

20 Claims, 6 Drawing Sheets

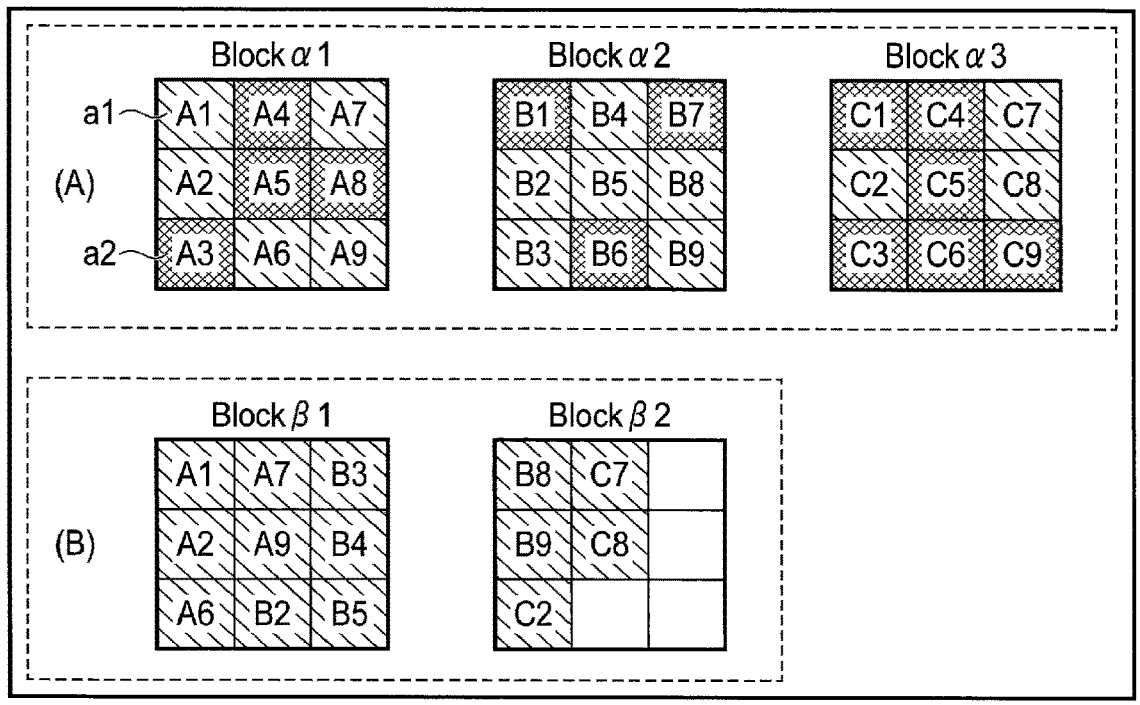
F I G. 4
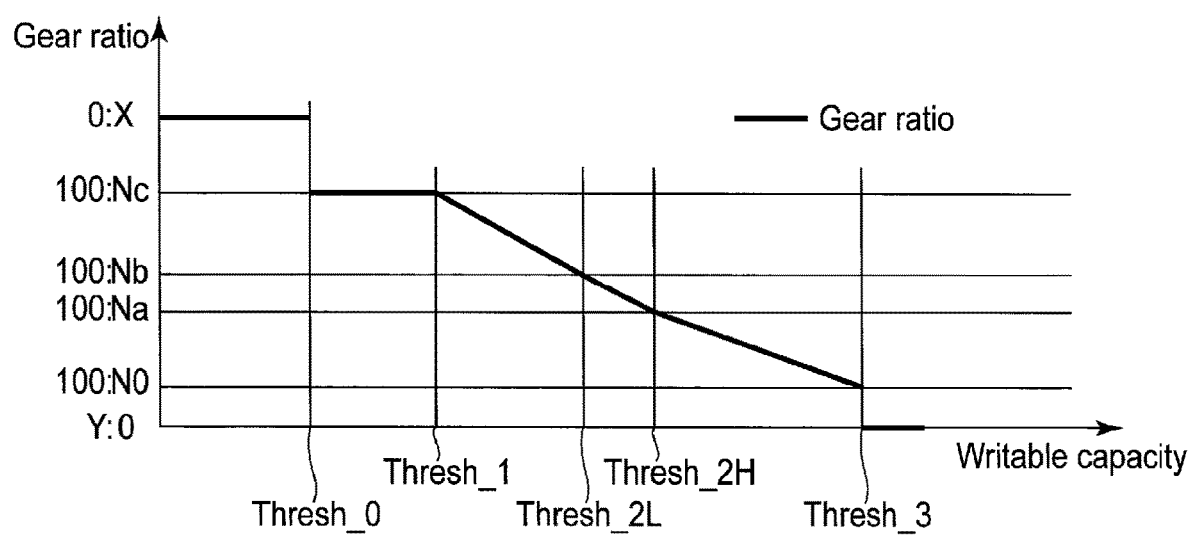
F I G. 5

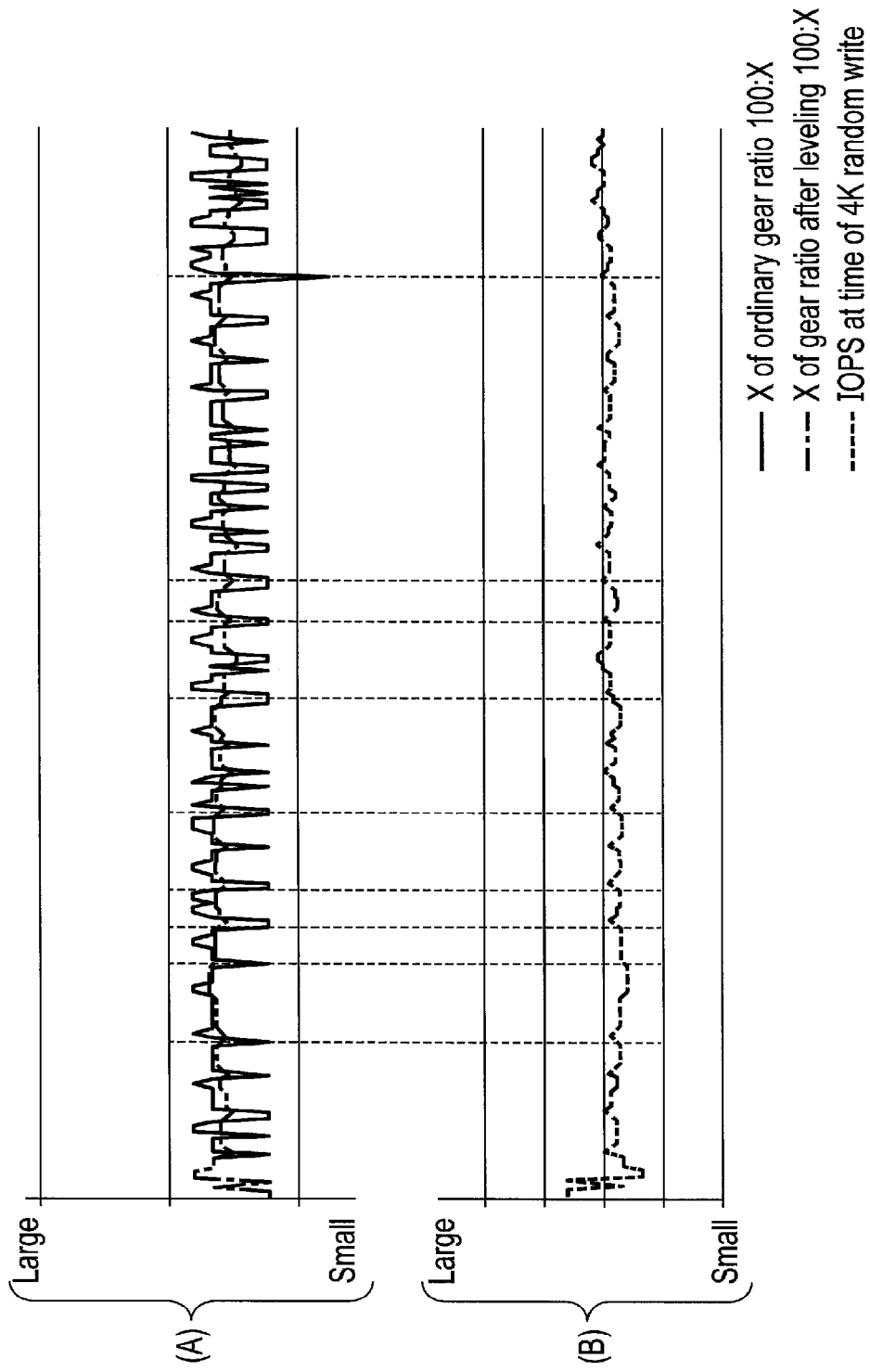
F I G. 7

MEMORY SYSTEM AND GARBAGE COLLECTION CONTROL METHOD

CROSS-REFERENCE TO RELATED APPLICATIONS

This application is based upon and claims the benefit of priority from Japanese Patent Application No. 2019-190255, filed Oct. 17, 2019, the entire contents of which are incorporated herein by reference.

FIELD

Embodiments described herein relate generally to a memory system and a garbage collection control method.

BACKGROUND

In memory systems such as solid-state drives (i.e., SSDs) in which a NAND flash memory (i.e., NAND memory) is installed, it is necessary to execute a process called garbage collection for reusing a storage area where data that have become unnecessary (i.e., invalid data) remain in the NAND memory. Garbage collection is also called compaction.

The performance cycle of garbage collection is, for example, adjusted by adjusting the ratio between writing of data in response to a request from a host and writing of data for garbage collection. This ratio is called a gear ratio, etc. In addition, the gear ratio also may be calculated in accordance with the data writable capacity remaining in the NAND memory.

However, during the performance of random write, which may greatly change the data writable capacity, the gear ratio may repeatedly fluctuate. In accordance with the fluctuations in the gear ratio, input and output per second (i.e., IOPS) may vary. IOPS is an index corresponding to the performance of a memory system, and is a value indicating the number of read commands or write commands from a host that can be executed per second.

BRIEF DESCRIPTION OF THE DRAWINGS

FIG. 4 is a diagram for explaining a summary of garbage collection performed to secure a free block in the memory system of the embodiment.

FIG. 5 is a diagram illustrating an example of a graph used to calculate a gear ratio in the memory system of the embodiment.

FIG. 7 is a diagram illustrating an example of a transition of the gear ratio and a transition of IOPS during the performance of random write in the memory system of the embodiment.

DETAILED DESCRIPTION

In general, according to one embodiment, a memory system includes a nonvolatile memory and a controller. The nonvolatile memory includes a plurality of blocks. The controller is configured to control writing of data to the nonvolatile memory, reading of data from the nonvolatile memory, and garbage collection for preparing one or more free blocks by writing valid data read from N (N is a natural number greater than or equal to 2) blocks to one or more blocks of less than the N. The controller is configured to calculate a performance ratio between writing of data in response to a request from a host device and writing of data for the garbage collection in accordance with a data writable capacity remaining in the nonvolatile memory, calculate an average performance ratio from calculated performance ratios of M (M is a natural number greater than or equal to 2) generations including a calculated latest performance ratio, and adjust a performance cycle of the garbage collection by applying one of the calculated latest performance ratio and the calculated average performance ratio.

Embodiments will be described hereinafter with reference to the accompanying drawings.

Figure 1:
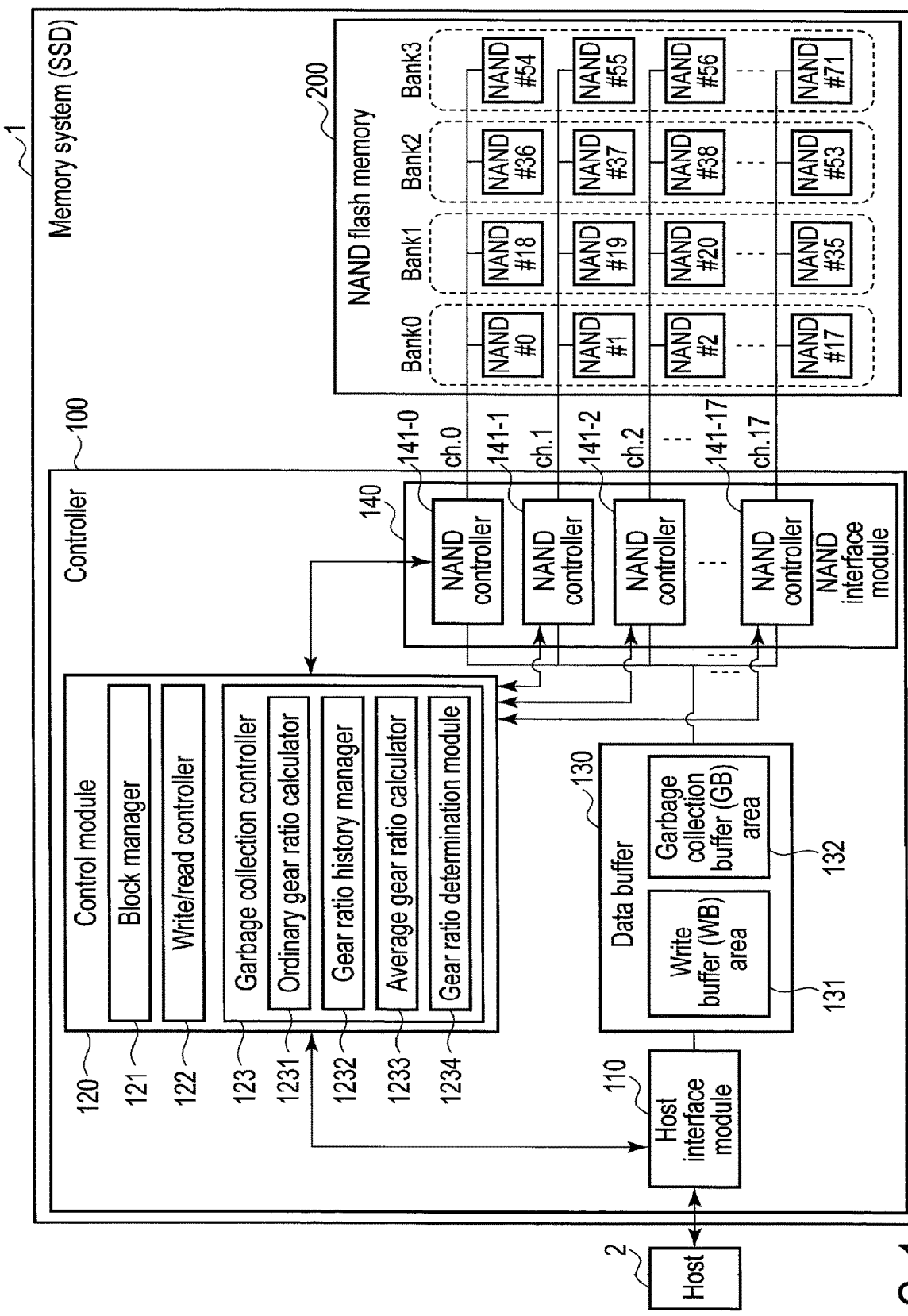
FIG. 1 is a diagram illustrating a configuration example of a memory system of an embodiment.

FIG. 1 is a diagram illustrating a configuration example of a memory system 1 of a present embodiment. An example in which the memory system 1 is realized as an SSD is herein illustrated.

The memory system 1, which is an SSD, comprises a controller 100, which is formed as a semiconductor integrated circuit, for example, a system-on-chip (i.e., SoC), and a NAND flash memory (i.e., NAND memory) 200.

The controller 100 comprises a host interface module 110, a control module 120, a data buffer 130, which is for example an SRAM, and a NAND interface module 140. The data buffer 130 may be provided outside the controller 100 as, for example, an SDRAM.

The host interface module 110 is a device including a circuit which connects the memory system 1 and a host 2, and performs communication conforming to, for example, PCIe (registered trademark). The host interface module 110 receives a command from the host 2.

The control module 120 receives a command from the host 2 connected via the host interface module 110, executes a process corresponding to the command, and transmits a result of the process to the host 2. Commands received from the host 2 include a write command to write data and a read command to read data. Specifically, the control module 120 performs writing of data to the NAND memory 200 and reading of data from the NAND memory 200, using the data buffer 130 as a temporary data storage area.

The control module 120 includes a processor, for example, a CPU. The control module 120 realizes various processing modules such as a block manager 121, a write and read controller 122, and a garbage collection controller 123 by, for example, executing firmware (program) stored in the NAND memory 200. Part or all of these processing modules may be realized as hardware, for example an electronic circuit, instead of being realized as software through the execution of a program by a CPU.

When the various processing modules are realized as software, the control module 120 may execute the processes of the processing modules by CPUs in parallel or execute the processes of the processing modules by a single CPU in a time-division manner. Moreover, the processes of the processing modules may be executed by CPUs in parallel and in a time-division manner.

The block manager 121 builds a logical block, which is an extensive management unit, from some physical blocks of a plurality of physical blocks included in the NAND memory 200. In the following description, a mere "block" means a logical block. In addition, the block manager 121 manages information on a logical block (i.e., block information), and supplies a logical block to the write and read controller 122, the garbage collection controller 123, etc.

The logical block managed by the block manager 121 is herein described with reference to FIG. 2 and FIG. 3 in addition to FIG. 1.

As illustrated in FIG. 1, the NAND memory 200 includes NAND flash memory dies (i.e., NAND memory dies) NAND #0 to #71. The NAND memory dies include a memory cell array which includes physical blocks and which can store data in a nonvolatile manner, and a peripheral circuit which controls the memory cell array. The individual NAND memory dies can operate independently. That is, the NAND memory dies function as parallel operation units. The NAND memory dies are also referred to as NAND flash memory chips, nonvolatile memory chips, etc. The same number of NAND memory dies (e.g., 4 NAND memory dies per channel) can be connected to each channel (e.g., 18 channels Ch.0 to Ch.17). Each of the channels Ch.0 to Ch.17 includes a communication line (i.e., memory bus) for allowing NAND controllers 141_0 to 141_17 of the NAND interface module 140 to communicate with each NAND memory die.

For example, the NAND memory dies #0 to #17, the NAND memory dies #18 to #35, the NAND memory dies #36 to #53, and the NAND memory dies #54 to #71, which are connected to the channels Ch.0 to Ch.17 in parallel in units of 18 NAND memory dies, may be each organized into banks (e.g., banks 0 to 3). The banks function as units for causing the NAND memory dies to operate in parallel by bank interleaving. In the configuration example illustrated in FIG. 1, a maximum of 72 NAND memory dies can operate in parallel by the 18 channels Ch.0 to Ch.17 and bank interleaving of 4 banks.

Figure 2:
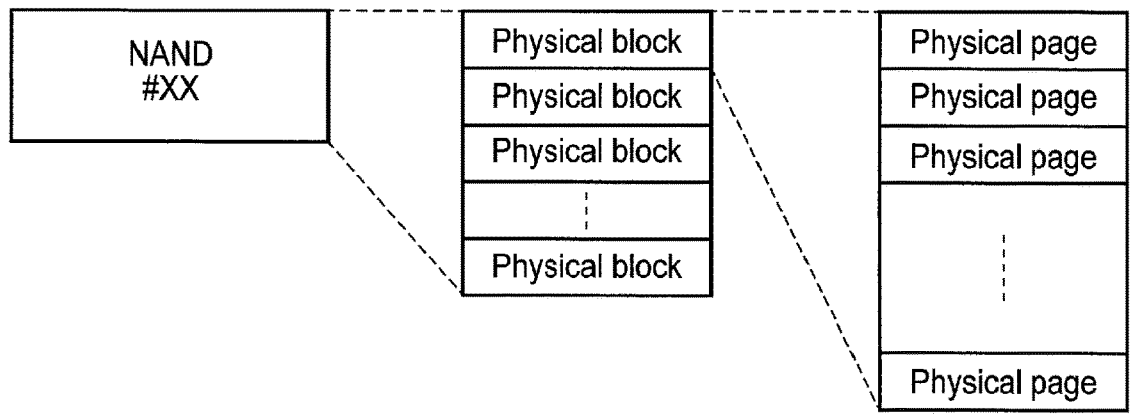
FIG. 2 is a diagram illustrating a configuration example of NAND flash memory dies included in a NAND flash memory installed in the memory system of the embodiment.

FIG. 2 is a diagram illustrating a configuration example of the NAND memory dies.

As illustrated in FIG. 2, the NAND memory dies include physical blocks each including physical pages. In the following description, a mere "page" means a physical page. Writing of data and reading of data are processed in page units. In contrast, erasing of data is processed in physical block units. A page in which data have already been written is not overwritten with data. Thus, data are updated by invalidating original data in a page and writing new data to another page. Accordingly, there can be a state in which most of a physical block is occupied by data that have become unnecessary (i.e., invalid data). The proportion of valid data in a valid area where data can be stored, except for a defective page, in a physical block is referred to as a valid cluster rate, etc. In addition, a process for reusing an area where data that have become unnecessary remain, mainly in a physical block having a small valid cluster rate, is referred to as garbage collection or compaction. The details of garbage collection will be described later.

Figure 3:
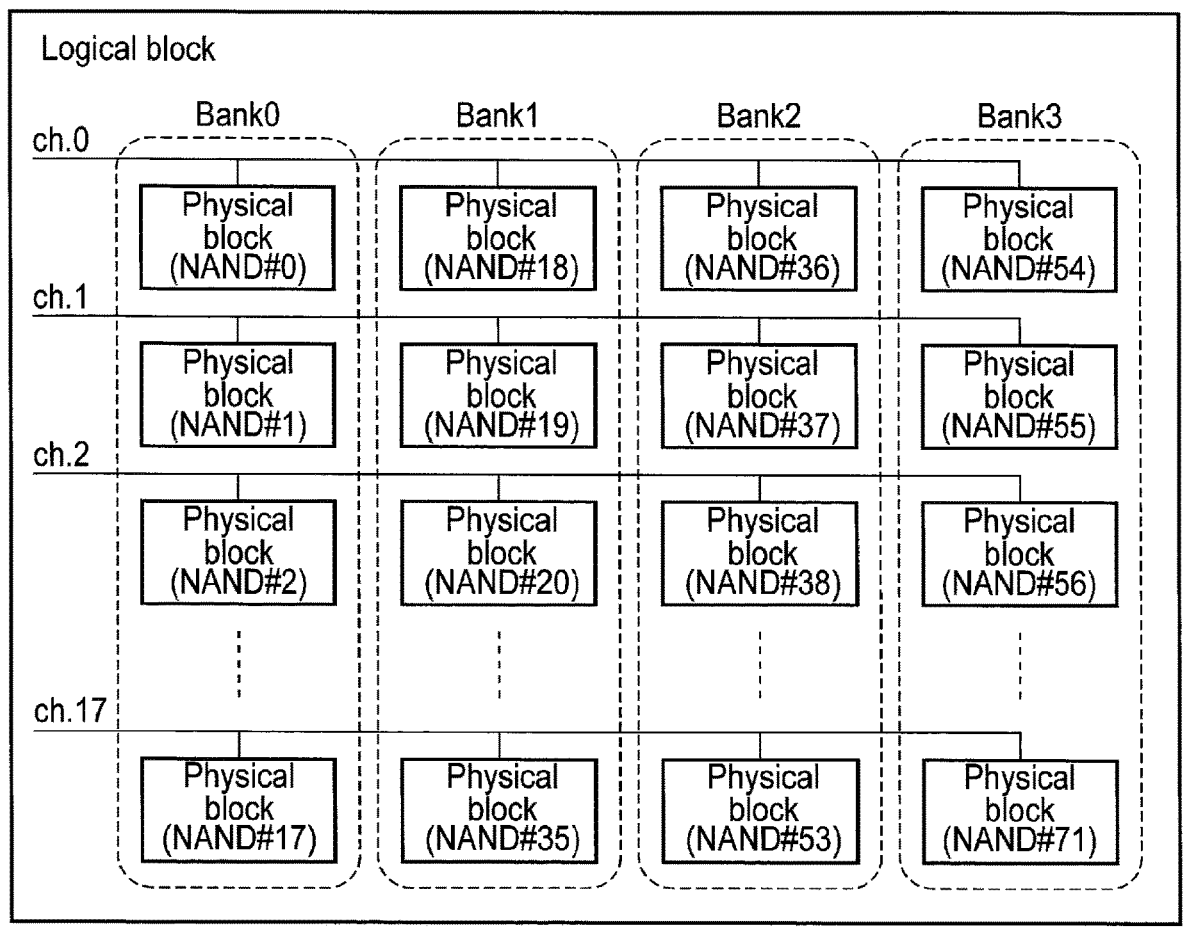
FIG. 3 is a diagram illustrating a configuration example of a logical block managed regarding the NAND flash memory in the memory system of the embodiment.

FIG. 3 is a diagram illustrating a configuration example of a logical block managed by the block manager 121.

The block manager 121 manages logical blocks each including physical blocks. In the memory system 1, at least erasing of data is performed in logical block units.

The block manager 121, for example, selects one physical block from each of the NAND memory dies #0 to #71 and manages a logical block including a total of 72 physical blocks. Since the NAND memory dies #0 to #71 can operate in parallel by eighteen channels and bank interleaving of four banks, writing of data to one logical block can be performed in units of 72 pages, for example. The block manager 121 may manage a logical block, selecting one physical block from each of fewer than 72 (e.g., 36 or 18) NAND memory dies. Regarding the combination of NAND memory dies of one logical block, it is preferable that their channels and banks be different from each other. When each of the NAND memory dies has a multiplane (e.g., two-plane) structure, the block manager 121 may, for example, select one physical block from each of 144 planes corresponding to the NAND memory dies #0 to #71 and manage a logical block including a total of 144 physical blocks.

The explanation of each processing module of the control module 120 will be continued with reference to FIG. 1 again.

The write and read controller 122 performs writing of data to the NAND memory 200 or reading of data from the NAND memory 200 requested by the host 2. More specifically, in the case of writing of data, the write and read controller 122 instructs any one of the NAND controllers 141_1 to 141_17 of the NAND interface module 140 to write, to the NAND memory 200, write data received via the host interface module 110 and stored in a write buffer (WB) area 131 in the data buffer 130. In the case of reading of data, the write and read controller 122 instructs any one of the NAND controllers 141_1 to 141_17 of the NAND interface module 140 to read read data from the NAND memory 200. The read data are temporarily stored in the data buffer 130, and are transmitted to the host 2 via the host interface module 110.

In addition, the write and read controller 122 receives a block supplied from the block manager 121 and performs writing of data to the NAND memory 200. The block manager 121 manages whether each block is used, the total number of blocks, the number of blocks in an unused state, etc., as block information. The blocks in the unused state do not mean blocks which have never been used, but mean blocks which can be reused by erasing data therein. As a matter of course, the blocks which have never been used are also included in the blocks in the unused state. In the following description, the blocks in the unused state are referred to as free blocks.

The garbage collection controller 123 performs garbage collection in order to secure a free block. The garbage collection controller 123 comprises an ordinary gear ratio calculator 1231, a gear ratio history manager 1232, an average gear ratio calculator 1233, and a gear ratio determination module 1234. The details of these processing units of the garbage collection controller 123 will be described later.

A summary of garbage collection performed by the garbage collection controller 123 is herein explained with reference to FIG. 4.

In FIG. 4, each block is constituted of 9 pages. Three blocks α1, α2, and α3 in part (A) of FIG. 4 are blocks selected by the garbage collection controller 123 as sources of valid data. On the other hand, two blocks β1 and β2 in part (B) of FIG. 4 are blocks supplied to the garbage collection controller 123 by the block manager 121 as destinations of valid data. In addition, pages having a hatched pattern a1 of each block in part (A) of FIG. 4 are pages in which valid data are stored. On the other hand, pages having a hatched pattern a2 are pages in which data that have become unnecessary remain.

The garbage collection controller 123 selects any one of the blocks as a candidate for a source of valid data. In addition, the block manager 121 supplies a block to be a destination of valid data to the garbage collection controller 123.

The block manager 121 manages a valid cluster rate of each block as block information. Thus, the garbage collection controller 123 selects a block to be a candidate for a source of valid data in order from smallest valid cluster rate to largest valid cluster rate in cooperation with the block manager 121.

In the example illustrated in FIG. 4, the number of pages in which valid data are stored is 5 (A1, A2, A6, A7, and A9) in the block α1, 6 (B2, B3, B4, B5, B8, and B9) in the block α2, and 3 (C2, C7, and C8) in the block α3. That is, the total number of pages in which valid data are stored is 14 in the three blocks. In other words, 13 pages are wasted in the three blocks. The number of wasted pages exceeds the number of pages in one block.

The garbage collection controller 123 writes only valid data in a block selected as a source of valid data to a block supplied by the block manager 121 as a destination of valid data. This writing of data for movement is performed within a total of 14 pages, that is, two blocks. Thus, one free block, obtained by deducting the two blocks from the original three blocks, is prepared.

The garbage collection controller 123 performs garbage collection, using the data buffer 130 as a work area. A garbage collection buffer (GB) area 132 in the data buffer 130 illustrated in FIG. 1 is an area allocated for the garbage collection controller 123.

The NAND interface module 140 is a device for communicating with the NAND memory 200, and comprises the above-described NAND controllers 141_0 to 141_17, which are paired with the channels Ch.0 to Ch.17, respectively. The control module 120, more specifically, the write and read controller 122 and the garbage collection controller 123, control the NAND controllers 141_0 to 141_17 of the NAND interface module 140 and perform writing of data to the NAND memory 200 and reading of data from the NAND memory 200.

The performance cycle of garbage collection performed by the garbage collection controller 123 is next described.

As described above, the block manager 121 manages at least the total number of blocks and the number of free blocks as block information. The garbage collection controller 123 controls the performance cycle of garbage collection performed to secure a free block, for example, based on the number or proportion of free blocks in the total number of blocks. More specifically, the garbage collection controller 123 adjusts the performance cycle such that garbage collection is performed in a shorter cycle as the number of free blocks becomes smaller.

The garbage collection controller 123 adjusts the performance cycle by adjusting the ratio between writing of data in response to a request from the host (hereinafter, also referred to as host write) and writing of data for garbage collection (hereinafter, also referred to as GC write) performed by the write and read controller 122. That is, the garbage collection controller 123 adjusts the performance cycle of garbage collection such that host write will not exceed a permissible range and stagnate because of GC write.

The ratio between host write and GC write is referred to as, for example, a gear ratio. Increasing the proportion of GC write to host write is herein described as increasing the gear ratio. The gear ratio can be expressed as A:B, where A is the number of times of host write per unit time and B is the number of times of GC write per unit time. The garbage collection controller 123 adjusts the performance cycle of garbage collection by adjusting the gear ratio such that the value of B becomes greater as the number of free blocks becomes smaller.

With the gear ratio of A:B, when A blocks are consumed by host write, B blocks are consumed by GC write. In this case, it suffices if the garbage collection controller 123 performs garbage collection to prepare at least A+B free blocks or multiples of A+B of free blocks.

In addition, the garbage collection controller 123 may stop garbage collection in such a case where the number of free blocks is sufficient and it is unnecessary to further prepare a free block or a case where there is no block having a small valid cluster rate and efficient preparation of a free block cannot be expected.

FIG. 5 is a diagram illustrating an example of a graph used to calculate the gear ratio.

In FIG. 5, the vertical axis shows the gear ratio, and the horizontal axis shows the data writable capacity remaining in the NAND memory 200. The data writable capacity may be the number of free blocks, or the number of free pages (i.e., pages to which data can be written but have not been written), which are smaller than blocks. An example in which the data writable capacity is the number of free blocks is herein described.

Gear ratios "100:N0", "100:Na", "100:Nb", and "100:Nc" are indicative that when host write is performed 100 times, GC write is performed N0 times, Na times, Nb times, and Nc times, respectively (N0<Na<Nb<Nc). In addition, a gear ratio "0:X" is indicative that host write is stopped and GC write is performed. A gear ratio "Y:0" is indicative that garbage collection is stopped.

Threshold values "Thresh_0", "Thresh_1, "Thresh_2L", "Thresh_2H", and "Thresh_3" on the horizontal axis showing the data writable capacity are threshold values provided to derive the gear ratio from the data writable capacity.

For example, when the data writable capacity is greater than the threshold value "Thresh_3", garbage collection is stopped (gear ratio "Y:0"). On the other hand, when the data writable capacity is less than the threshold value "Thresh_0", the gear ratio is "0:X". In addition, when the data writable capacity is between the threshold values "Thresh_0" and "Thresh_1", the gear ratio is "100:Nc". Moreover, when the data writable capacity is equal to the threshold value "Thresh_3", the gear ratio is "100:N0".

In a case where the data writable capacity is between the threshold values "Thresh_1" and "Thresh_3", for example, it is determined that the gear ratio is "100:Nb" when the data writable capacity is equal to the threshold value "Thresh_2L" and the gear ratio is "100:Na" when the data writable capacity is equal to the threshold value "Thresh_2H". The gear ratios between the threshold values "Thresh_1" and "Thresh_2L", between the threshold values "Thresh_2L" and "Thresh_2H", and between the threshold values "Thresh_2H" and "Thresh_3" are derived by interpolating straight lines connecting the gear ratios at both ends of each range. While an example in which the threshold values "Thresh_2L" and "Thresh_2H" are provided between the threshold values "Thresh_1" and "Thresh_3" has been herein described, this is a mere example. The setting of threshold values for deriving the gear ratio from the data writable capacity is not limited to this example, and can be changed in various ways, such as defining three or more threshold values between the threshold values "Thresh_1" and "Thresh_3".

The above-described calculation of the gear ratio based on the data writable capacity remaining in the NAND memory 200 is performed by the ordinary gear ratio calculator 1231 of the garbage collection controller 123 in the memory system 1 of the present embodiment. The ordinary gear ratio calculator 1231 calculates the gear ratio, for example, in response to a fluctuation in the number of free blocks. The ordinary gear ratio calculator 1231 may calculate the gear ratio periodically at predetermined intervals. The garbage collection controller 123 including the ordinary gear ratio calculator 1231 acquires the number of free blocks, that is, the data writable capacity remaining in the NAND memory 200, from the block manager 121.

Figure 6:
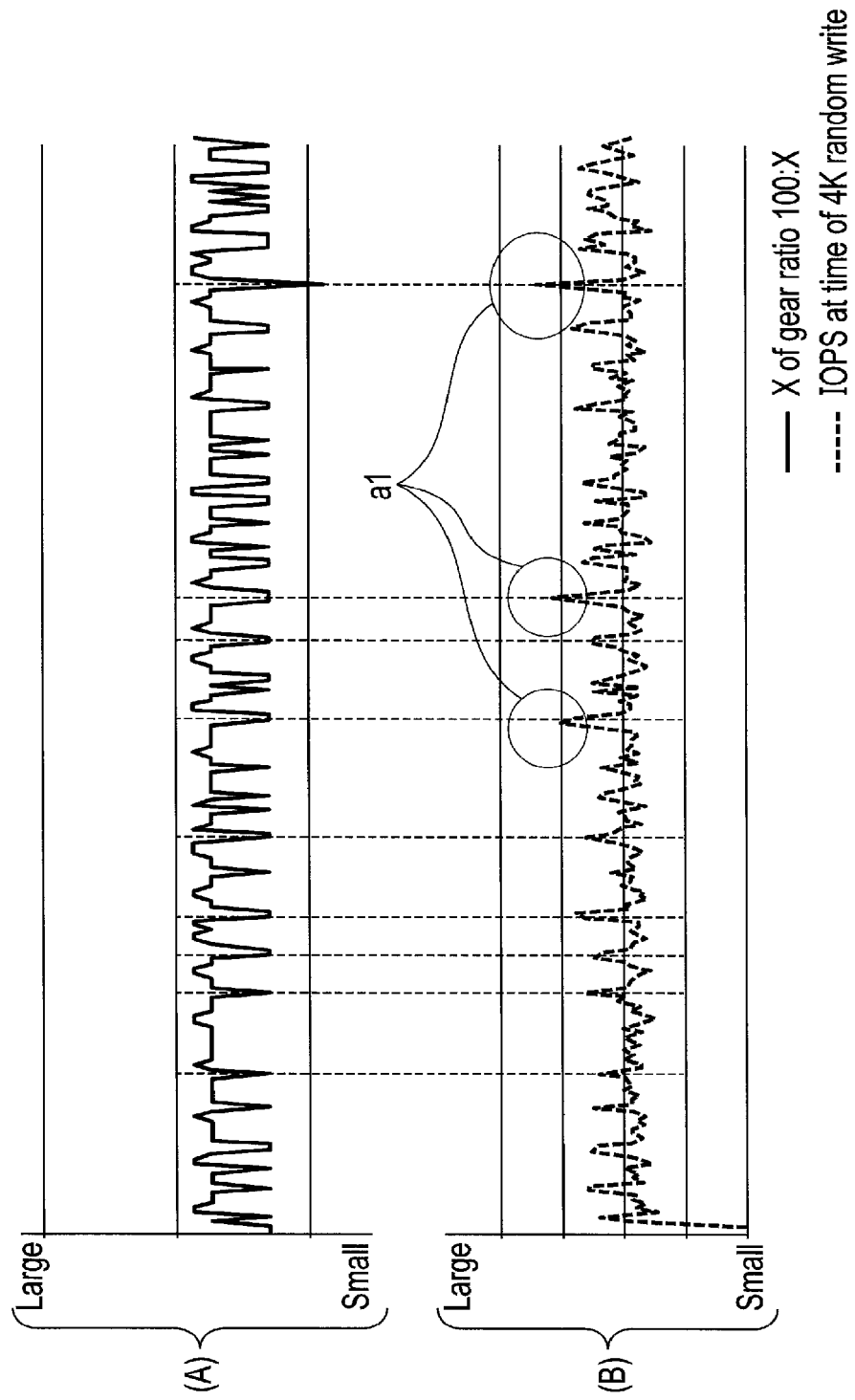
FIG. 6 is a diagram illustrating an example of fluctuations in the gear ratio and variations in IOPS according to the fluctuations in the gear ratio during the performance of random write in the memory system of the embodiment.

Incidentally, during the performance of random write, free blocks are easily consumed, and are easily prepared (because data are invalidated in a large number of blocks), that is, the number of free blocks easily fluctuates. Thus, there is a possibility that the gear ratio fluctuates frequently and IOPS varies in accordance with the fluctuations in the gear ratio. FIG. 6 is a diagram illustrating an example of fluctuations in the gear ratio and variations in IOPS according to the fluctuations in the gear ratio during the performance of random write.

Part (A) of FIG. 6 illustrates the transition of the gear ratio, and part (B) of FIG. 6 illustrates the transition of IOPS. In addition, reference numeral a1 in part (B) of FIG. 6 indicates spots where IOPS significantly varies. In the memory system 1, it is preferable that such variations not occur and the write performance be stable. Thus, the memory system 1 according to the present embodiment comprises a mechanism which can level the fluctuations in the gear ratio. This point will be described hereinafter.

As described above with reference to FIG. 1, the garbage collection controller 123 comprises the ordinary gear ratio calculator 1231, the gear ratio history manager 1232, the average gear ratio calculator 1233, and the gear ratio determination module 1234. In addition, as described above, the ordinary gear ratio calculator 1231 calculates a gear ratio, which is the ratio between host write and GC write, based on the data writable capacity remaining in the NAND memory 200.

The gear ratio history manager 1232 stores a maximum of M gear ratios calculated by the ordinary gear ratio calculator 1231. In other words, the gear ratio history manager 1232 manages gear ratios of a maximum of M generations, calculated by the ordinary gear ratio calculator 1231. If gear ratios of M generations are already managed when a gear ratio is calculated by the ordinary gear ratio calculator 1231, the gear ratio history manager 1232 discards the oldest gear ratio and stores the calculated latest gear ratio. In addition, the gear ratio history manager 1232 discards all the managed gear ratios of a maximum of M generations in a predetermined situation (i.e., in a second state), which will be described later.

When a gear ratio is calculated by the ordinary gear ratio calculator 1231 and the number of generations of the gear ratios managed by the gear ratio history manager 1232 reaches M, the average gear ratio calculator 1233 uses gear ratios of M or less generations managed by the gear ratio history manager 1232 which include the latest gear ratio calculated by the ordinary gear ratio calculator 1231, and calculates an average gear ratio, which is the average of these gear ratios. In the following description, the gear ratios calculated by the ordinary gear ratio calculator 1231 may be referred to as ordinary gear ratios in order to clearly distinguish them from the average gear ratio calculated by the average gear ratio calculator 1233. While the average gear ratio is herein calculated when the number of generations of the managed gear ratios reaches M, the average gear ratio may be calculated when gear ratios of L (L is a natural number greater than or equal to 2 but less than M) or more generations are managed.

The gear ratio determination module 1234 determines which of the latest ordinary gear ratio calculated by the ordinary gear ratio calculator 1231 and the average gear ratio calculated by the average gear ratio calculator 1233 should be applied, for example, in accordance with the data writable capacity remaining in the NAND memory 200, such as the number of free blocks.

For example, when the data writable capacity is greater than or equal to the threshold value "Thresh_1" but is less than the threshold value "Thresh_3" shown in FIG. 5, the gear ratio determination module 1234 determines that the average gear ratio calculated by the average gear ratio calculator 1233 is applied, and reduces the fluctuations in the gear ratio. That is, the performance is stabilized. Here, the data writable capacity is denoted by K, and a state in which "Thresh_1"≤K<"Thresh_3" and the average gear ratio should be applied is referred to as a first state. On the other hand, a state in which K<"Thresh_1" or K≥"Thresh_3" and the average gear ratio should not be applied, that is, a state in which the ordinary gear ratio should be applied, is referred to as the second state. In addition, reducing the fluctuations in the gear ratio is also described as leveling the gear ratio. When gear ratios of M generations are not managed by the gear ratio history manager 1232, the gear ratio determination module 1234 may determine that the latest ordinary gear ratio calculated by the ordinary gear ratio calculator 1231 is applied.

In the second state in which the data writable capacity is less than the threshold value "Thresh_1" (i.e., K<"Thresh_1"), the prevention of a failure of the device (i.e., the SSD, which is the memory system 1) should be prioritized over the stabilization of the performance. Thus, the gear ratio determination module 1234 determines that the latest ordinary gear ratio calculated by the ordinary gear ratio calculator 1231 is applied. In this situation, the ordinary gear ratio calculator 1231 calculates that the gear ratio is "0:X", and thus, the memory system 1 stops host write and prioritizes GC write. In addition, in response to the start of the second state, the gear ratio determination module 1234 instructs the gear ratio history manager 1232 to discard all the managed gear ratios of a maximum of M generations.

In addition, also in the second state in which the data writable capacity is greater than or equal to the threshold value "Thresh_3" (i.e., K≥"Thresh_3"), the gear ratio determination module 1234 determines that the latest ordinary gear ratio calculated by the ordinary gear ratio calculator 1231 is applied. A state in which K≥"Thresh_3" is a state in which the number of free blocks is sufficient and it is unnecessary to further prepare a free block. In this situation, the ordinary gear ratio calculator 1231 calculates that the gear ratio is "0", which means the stop of garbage collection. That is, when K≥"Thresh_3", the gear ratio determination module 1234 adopts the ordinary gear ratio and thereby immediately stops garbage collection in the background such that useless garbage collection will not be performed. By avoiding useless GC write, an improvement in performance and a life extension effect of the SSD, which is the memory system 1, can be expected. Also in this case, the gear ratio determination module 1234 instructs the gear ratio history manager 1232 to discard all the managed gear ratios of a maximum of M generations.

As described above, even in the first state in which "Thresh_1"≤K<"Thresh_3", when gear ratios of M generations are not managed by the gear ratio history manager

1232, the gear ratio determination module 1234 determines that the latest ordinary gear ratio calculated by the ordinary gear ratio calculator 1231 is applied. In a case where an average gear ratio is calculated when gear ratios of, not M generations, but L or more generations are managed, when only gear ratios of less than L generations are managed, the gear ratio determination module 1234 determines that the latest ordinary gear ratio calculated by the ordinary gear ratio calculator 1231 is applied. The gear ratio history manager 1232 discards gear ratios in the previous first state before the second state, and does not manage these gear ratios. In addition, an average gear ratio calculated from a small number of ordinary gear ratios, which is less than a predetermined number (i.e., M or L), is not adopted. Accordingly, the fluctuations in the gear ratio can be appropriately leveled.

FIG. 7 is a diagram illustrating examples of the transition of the gear ratio and the transition of IOPS during the performance of random write in the memory system 1 according to the present embodiment.

Part (A) of FIG. 7 illustrates the transition of the gear ratio (i.e., gear ratio after leveling) during the performance of random write in the memory system 1 according to the present embodiment, together with the transition of a gear ratio (i.e., conventional gear ratio) shown in part (A) of FIG. 6. In contrast, part (B) of FIG. 7 illustrates the transition of IOPS during the performance of random write in the memory system 1 according to the present embodiment.

As illustrated in part (A) of FIG. 7, in the memory system 1 according to the present embodiment, the fluctuations in the gear ratio during the performance of random write are leveled. Accordingly, as illustrated in part (B) of FIG. 7, IOPS does not vary and the write performance is stabilized.

In this manner, the write performance can be stabilized in the memory system 1 according to the present embodiment, in which the garbage collection controller 123 comprises the gear ratio history manager 1232, the average gear ratio calculator 1233, and the gear ratio determination module 1234, in addition to the ordinary gear ratio calculator 1231.

Figure 8:
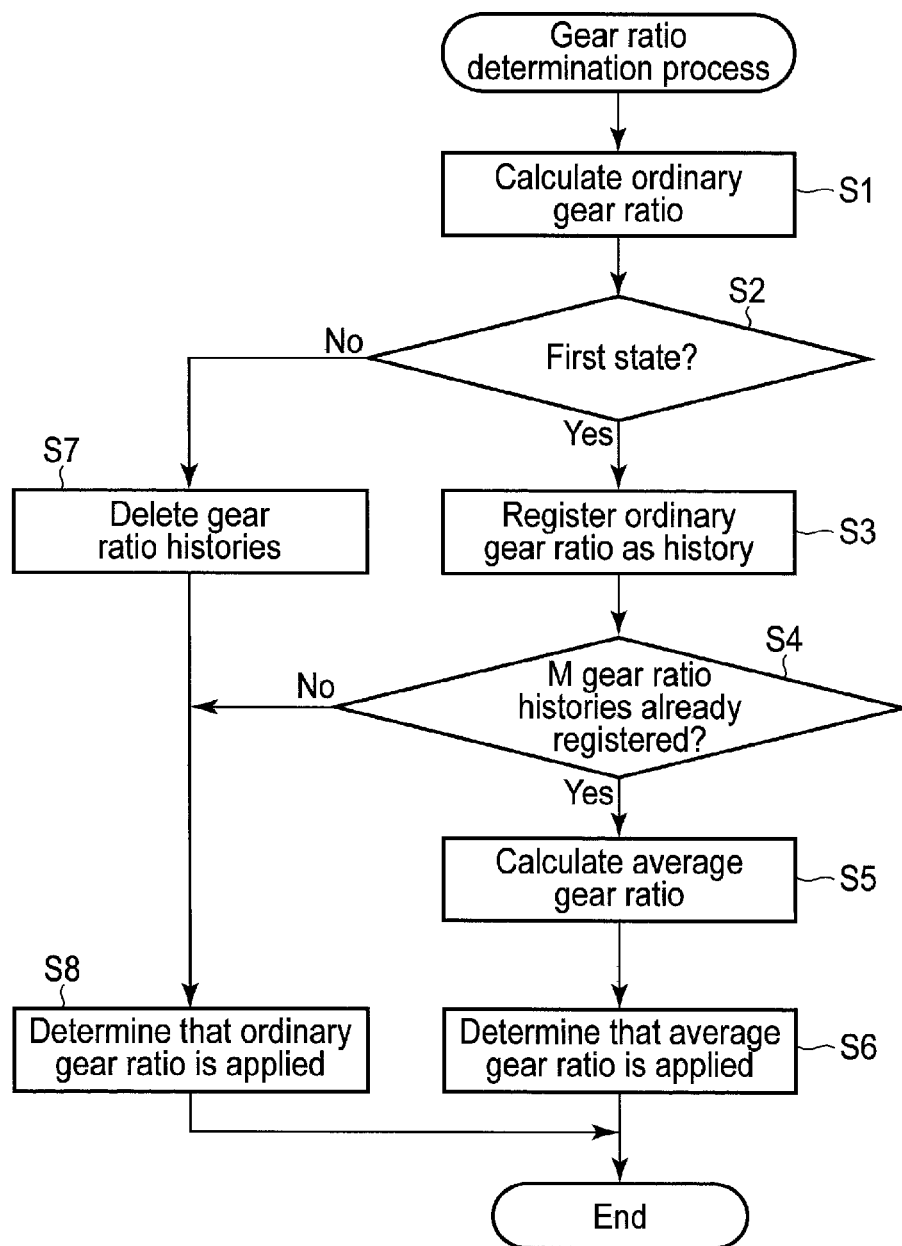
FIG. 8 is a flowchart illustrating a flow of a gear ratio determination process executed in the memory system of the embodiment.

FIG. 8 is a flowchart illustrating the flow of a gear ratio determination process executed by the garbage collection controller 123 of the memory system 1 according to the present embodiment. This gear ratio determination process is executed, for example, at a time when the number of free blocks fluctuates (declines) or periodically at predetermined intervals.

The ordinary gear ratio calculator 1231 calculates an ordinary gear ratio, which is the ratio between writing of data in response to a request from the host 2 and writing of data for garbage collection, based on the data writable capacity remaining in the NAND memory 200 (S1). The ordinary gear ratio can be applied to adjust the performance cycle of garbage collection.

In the first state in which the data writable capacity is expressed as, for example, "Thresh_1"≥K<"Thresh_3" (refer to FIG. 5) (S2: Yes), the gear ratio history manager 1232 registers the ordinary gear ratio calculated by the ordinary gear ratio calculator 1231 as a history (S3). The gear ratio history manager 1232 can register a maximum of M gear ratios, and after the number of registered gear ratios reaches M, repeatedly discards the oldest gear ratio and registers the latest gear ratio.

When the gear ratio history manager 1232 has already registered M gear ratios (S4: Yes), the average gear ratio calculator 1233 calculates an average gear ratio from the M gear ratios (S5). That is, when the M gear ratios have already been registered (S4: Yes) in the first state (S2: Yes), the gear ratio determination module 1234 determines that the average gear ratio calculated by the average gear ratio calculator 1233 is applied as a gear ratio for adjusting the performance cycle of garbage collection (S6).

In contrast, in the second state in which K<"Thresh_1" or K≥"Thresh_3" (refer to FIG. 5) (S2: No), the gear ratio history manager 1232 deletes all the ordinary gear ratios already registered as histories (S7). In addition, in this case, the gear ratio determination module 1234 determines that the ordinary gear ratio calculated by the ordinary gear ratio calculator 1231 is applied as the gear ratio for adjusting the performance cycle of garbage collection (S8).

Also when the number of ordinary gear ratios already registered by the gear ratio history manager 1232 does not reach M (S4: No) in the first state (S2: Yes), the gear ratio determination module 1234 determines that the ordinary gear ratio calculated by the ordinary gear ratio calculator 1231 is applied as the gear ratio for adjusting the performance cycle of garbage collection (S8).

As described above, in the memory system 1 according to the present embodiment, when the data writable capacity is within a predetermined range, ordinary gear ratios of a predetermined number of generations are stored, an average gear ratio is calculated from the stored ordinary gear ratios of the predetermined number of generations, and the calculated average gear ratio is applied as a gear ratio for adjusting the performance cycle of garbage collection. Accordingly, the memory system 1 according to the present embodiment levels the fluctuations in the gear ratio during the performance of random write and stabilizes the write performance without causing variations in IOPS.

Incidentally, in an SSD, for example, in order to prevent the write performance from declining because the number of free blocks is small, a NAND memory having a capacity greater than a nominal value may be installed, which is called overprovisioning, etc. Overprovisioning also has the effect of maintaining a nominal value to the utmost even when a partial failure occurs in the NAND memory because of, for example, aging deterioration.

When the NAND memory 200 having a capacity greater than a nominal value, that is, a capacity greater than the capacity of a storage area provided for the host 2 is installed in the memory system 1 according to the present embodiment, the garbage collection controller 123 can change a threshold value for determining whether the current state is the first state or not adaptively in accordance with an overprovisioning ratio, which is the ratio of the total capacity of an available storage area in the NAND memory 200 to the capacity of the storage area provided for the host 2. Here, the available storage area does not mean a free block but means a block in which no failure occurs and normal operations such as write, read, and erasing of data can be performed.

More specifically, the gear ratio determination module 1234 changes the threshold value "Thresh_1" in FIG. 5 to the "Thresh_0" side and expands the range in which an average gear ratio is applied (Thresh_1 to Thresh_3) as the overprovisioning ratio becomes greater, and changes the threshold value "Thresh_1" to the "Thresh_3" side and limits the range in which an average gear ratio is applied as the overprovisioning rate becomes smaller.

Accordingly, the memory system 1 according to the present embodiment can level the fluctuations in the gear ratio during the performance of random write in accordance with the more practical situation of the storage area.

In addition, at the time of a transition from a situation in which an average gear ratio should be applied to a situation in which an ordinary gear ratio should be applied, the gear ratio determination module 1234 may gradually change the applied gear ratio from the average gear ratio to the ordinary gear ratio, instead of immediately applying the ordinary gear ratio. Specifically, for example, when the data writable capacity is greater than or equal to the threshold value "Thresh_3", the gear ratio may be gradually changed from "100:Na" to "Y:0", instead of immediately stopping garbage collection (gear ratio "Y:0").

Accordingly, the memory system 1 according to the present embodiment can suppress a rapid fluctuation in the gear ratio, as well as leveling the fluctuations in the gear ratio during the performance of random write.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   a nonvolatile memory including a plurality of blocks; and
   a controller configured to control writing of data to the nonvolatile memory, reading of data from the nonvolatile memory, and garbage collection for preparing one or more free blocks by writing valid data read from N (N is a natural number greater than or equal to 2) blocks to one or more blocks of less than the N,
   wherein the controller is configured to
   calculate a performance ratio between writing of data in response to a request from a host device and writing of data for the garbage collection in accordance with a data writable capacity remaining in the nonvolatile memory,
   calculate an average performance ratio from calculated performance ratios of M (M is a natural number greater than or equal to 2) generations including a calculated latest performance ratio, and
   adjust a performance cycle of the garbage collection by applying one of the calculated latest performance ratio and the calculated average performance ratio.

2. The memory system of claim 1, wherein the controller is further configured to
   determine that the calculated average performance ratio is applied when the data writable capacity remaining in the nonvolatile memory is within a predetermined range, and
   determine that the calculated latest performance ratio is applied when the data writable capacity remaining in the nonvolatile memory is out of the predetermined range.

3. The memory system of claim 2, wherein:
   the controller is further configured to prioritize the writing of data for the garbage collection over the writing of data in response to the request from the host device, when the data writable capacity remaining in the nonvolatile memory is less than a first threshold value; and
   the predetermined range is greater than or equal to the first threshold value.

4. The memory system of claim 3, wherein:
   a total capacity of the blocks included in the nonvolatile memory is greater than a capacity of a storage area provided for the host device by the memory system; and
   the controller is capable of changing the first threshold value in accordance with a ratio of a total capacity of available blocks of the blocks to the capacity of the storage area provided by the memory system.

5. The memory system of claim 4, wherein the controller is further configured to change the first threshold value such that the predetermined range becomes larger as a value of the ratio of the total capacity of the available blocks of the blocks to the capacity of the storage area provided by the memory system becomes greater.

6. The memory system of claim 3, wherein the controller is further configured to
   store the calculated performance ratios of the M generations, and
   discard the stored performance ratios of the M generations, when the data writable capacity remaining in the nonvolatile memory is out of the predetermined range.

7. The memory system of claim 2, wherein:
   the controller is further configured to stop the writing of data for the garbage collection, when the data writable capacity remaining in the nonvolatile memory is greater than or equal to a second threshold value; and
   the predetermined range is less than the second threshold value.

8. The memory system of claim 2, wherein the controller is further configured to adjust the performance cycle of the garbage collection by applying a ratio having a value between the calculated average performance ratio and the calculated latest performance ratio, at a time of a transition from a state in which the calculated average performance ratio is to be applied to a state in which the calculated latest performance ratio is to be applied for adjusting the performance cycle of the garbage collection.

9. A memory system comprising:
   a nonvolatile memory including a plurality of blocks; and
   a controller configured to
   calculate, regarding a performance cycle of garbage collection, a performance ratio between writing of data in response to a request from a host device and writing of data for the garbage collection in accordance with a data writable capacity remaining in the nonvolatile memory, the garbage collection being for writing valid data read from N (N is a natural number greater than or equal to 2) blocks to one or more blocks of less than the N and preparing one or more free blocks, and
   calculate an average performance ratio from calculated performance ratios of M (M is a natural number greater than or equal to 2) generations.

10. The memory system of claim 9, wherein the controller is further configured to
    determine that the calculated average performance ratio is applied when the data writable capacity remaining in the nonvolatile memory is within a predetermined range for a performance cycle of the garbage collection, and
    determine that a latest performance ratio of the calculated performance ratios of the M generations is applied when the data writable capacity remaining in the nonvolatile memory is out of the predetermined range.

11. The memory system of claim 10, wherein:
    the controller is further configured to prioritize the writing of data for the garbage collection over the writing of data in response to the request from the host device, when the data writable capacity remaining in the nonvolatile memory is less than a first threshold value; and the predetermined range is greater than or equal to the first threshold value.

12. The memory system of claim 10, wherein:

the controller is further configured to stop the writing of data for the garbage collection, when the data writable capacity remaining in the nonvolatile memory is greater than or equal to a second threshold value; and the predetermined range is less than the second threshold value.

13. A garbage collection control method of a memory system comprising a nonvolatile memory including a plurality of blocks, the method comprising:

calculating a performance ratio between writing of data to the nonvolatile memory in response to a request from a host device and writing of data to the nonvolatile memory for garbage collection for writing valid data read from N (N is a natural number greater than or equal to 2) blocks to one or more blocks of less than the N and preparing one or more free blocks, in accordance with a data writable capacity remaining in the nonvolatile memory;

calculating an average performance ratio from calculated performance ratios of M (M is a natural number greater than or equal to 2) generations including a calculated latest performance ratio; and adjusting a performance cycle of the garbage collection by applying one of the calculated latest performance ratio and the calculated average performance ratio.

14. The method of claim 13, further comprising:

determining that the calculated average performance ratio is applied when the data writable capacity remaining in the nonvolatile memory is within a predetermined range; and determining that the calculated latest performance ratio is applied when the data writable capacity remaining in the nonvolatile memory is out of the predetermined range.

15. The method of claim 14, further comprising prioritizing the writing of data for the garbage collection over the writing of data in response to the request from the host device, when the data writable capacity remaining in the nonvolatile memory is less than a first threshold value, wherein the predetermined range is greater than or equal to the first threshold value.

16. The method of claim 15, wherein:

a total capacity of the blocks included in the nonvolatile memory is greater than a capacity of a storage area provided for the host device by the memory system; and the method further comprising changing the first threshold value in accordance with a ratio of a total capacity of available blocks of the blocks to the capacity of the storage area provided by the memory system.

17. The method of claim 16, further comprising changing the first threshold value such that the predetermined range becomes larger as a value of the ratio of the total capacity of the available blocks of the blocks to the capacity of the storage area provided by the memory system becomes greater.

18. The method of claim 15, further comprising:

storing the calculated performance ratios of the M generations; and discarding the stored performance ratios of the M generations, when the data writable capacity remaining in the nonvolatile memory is out of the predetermined range.

19. The method of claim 14, further comprising stopping the writing of data for the garbage collection, when the data writable capacity remaining in the nonvolatile memory is greater than or equal to a second threshold value, wherein the predetermined range is less than the second threshold value.

20. The method of claim 14, further comprising adjusting the performance cycle of the garbage collection by applying a ratio having a value between the calculated average performance ratio and the calculated latest performance ratio, at a time of a transition from a state in which the calculated average performance ratio is to be applied to a state in which the calculated latest performance ratio is to be applied for adjusting the performance cycle of the garbage collection.

* * * * *